US011259505B2

(12) United States Patent
Holm et al.

(10) Patent No.: US 11,259,505 B2
(45) Date of Patent: Mar. 1, 2022

(54) APPARATUS AND METHOD FOR WASHING SHELL EGGS

(71) Applicant: SANOVO TECHNOLOGY A/S, Odense Sø (DK)

(72) Inventors: Jan Holst Holm, Odense (DK); Aksel Morten Madsen, Aarup (DK)

(73) Assignee: Sanovo Technology A/S, Odense (DK)

( * ) Notice: Subject to any disclaimer, the term of this patent is extended or adjusted under 35 U.S.C. 154(b) by 23 days.

(21) Appl. No.: 16/481,371

(22) PCT Filed: Jan. 29, 2018

(86) PCT No.: PCT/EP2018/052138
§ 371 (c)(1),
(2) Date: Jul. 26, 2019

(87) PCT Pub. No.: WO2018/138339
PCT Pub. Date: Aug. 2, 2018

(65) Prior Publication Data
US 2019/0387719 A1 Dec. 26, 2019

(30) Foreign Application Priority Data
Jan. 27, 2017 (EP) ..................................... 17153547

(51) Int. Cl.
*A01K 43/00* (2006.01)
*B08B 3/02* (2006.01)

(52) U.S. Cl.
CPC ............ *A01K 43/005* (2013.01); *B08B 3/022* (2013.01)

(58) Field of Classification Search
None
See application file for complete search history.

(56) References Cited

U.S. PATENT DOCUMENTS 2,635,266 A 4/1953 Hutchinson
2,635,267 A 4/1953 Smith
(Continued)

FOREIGN PATENT DOCUMENTS

CN 205694972 U 11/2016
EP 0992752 A1 4/2000
(Continued)

OTHER PUBLICATIONS

PCT Appln. No. PCT/EP2018/052138, International Search Report, dated Jul. 6, 2018, 2 pages.

*Primary Examiner* — Mikhail Kornakov
*Assistant Examiner* — Pradhuman Parihar
(74) *Attorney, Agent, or Firm* — Avek IP, LLC

(57) ABSTRACT

An apparatus for washing shell eggs includes a washing unit and an egg conveyor extending in a longitudinal direction, and having a transverse direction. The longitudinal and transverse directions define a conveyor plane. Spray nozzles are arranged in the washing unit above the conveyor plane so that in a first step the eggs can be subjected to a liquid jet from a first liquid spray nozzle spraying in a first spray direction, and in a second step the eggs can be subjected to a liquid jet from a second liquid spray nozzle spraying in a second spray direction. The first and second spray nozzles are arranged on opposite sides of the egg when seen in the transverse direction and at a distance above the conveyor plane so that the liquid sprayed in the first and second spray directions hits the egg from opposite sides in a downwards angle.

20 Claims, 5 Drawing Sheets

(56) References Cited

U.S. PATENT DOCUMENTS

| | | | |
|---|---|---|---|
| 3,049,135 A * | 8/1962 | Kuhl | A01K 43/005 134/72 |
| 3,267,943 A | 8/1966 | Kuhl | |
| 3,505,698 A | 4/1970 | van de Schoot | |
| 4,125,914 A | 11/1978 | Warren | |
| 4,499,623 A | 2/1985 | Kuhl | |
| 4,698,867 A | 10/1987 | Kuhl | |
| 4,698,868 A | 10/1987 | Kuhl | |
| 4,793,015 A | 12/1988 | van der Schoot et al. | |
| 6,883,528 B2 | 4/2005 | Kuhl | |
| 2004/0023817 A1 | 2/2004 | Taylor et al. | |
| 2004/0238017 A1 * | 12/2004 | Kuhl | A01K 43/005 134/72 |

FOREIGN PATENT DOCUMENTS

| | | |
|---|---|---|
| EP | 2003958 B1 | 12/2008 |
| GB | 689918 | 4/1953 |
| WO | 9500012 | 1/1995 |

* cited by examiner

APPARATUS AND METHOD FOR WASHING SHELL EGGS

CROSS-REFERENCE TO RELATED APPLICATIONS

This Application is the U.S. national phase of, and claims priority to, International Application No. PCT/EP2018/052138, filed Jan. 29, 2018, which designated the U.S. and which claims priority to EP Patent No. EP 17153547.9, filed Jan. 27, 2017. These applications are each incorporated by reference herein in their entireties.

BACKGROUND

The present invention relates to an apparatus for washing shell eggs comprising an egg in-feed, an egg outlet, an egg conveyor, and a washing zone including a washing unit. The egg conveyor extends in a longitudinal direction from the egg in-feed to the egg outlet, and has a transverse direction, which is perpendicular to the longitudinal direction and substantially horizontal. The longitudinal direction and the transverse direction define a conveyor plane, and a plurality of egg paths for guiding rows of eggs in the longitudinal direction of the apparatus are defined. The washing unit comprises a plurality of liquid spray nozzles and a liquid distributing system for supplying a liquid to the liquid spray nozzles, where the liquid spray nozzles are arranged in rows extending in the longitudinal direction of the conveyor, and several such rows are arranged at a distance from each other in the transverse direction. The invention further relates to a method for washing shell eggs comprising the following sequence of steps: i) providing eggs via an egg in-feed to an egg conveyor, which extends in a longitudinal direction from the egg in-feed to an egg outlet and has a transverse direction, which is perpendicular to the longitudinal direction and substantially horizontal, where said longitudinal direction and said transverse direction define a conveyor plane, and ii) transporting the eggs in the longitudinal direction through a washing unit.

An apparatus and a method of this kind are known from U.S. Pat. No. 4,499,623, where the washing unit includes cylindrical brushes that rotate to facilitate complete cleaning of the eggs transported on the conveyor. A cleaning solution is provided by liquid spray nozzles arranged in a position above the cylindrical brushes. Additionally, downstream from the cylindrical brushes, the washing unit comprises flat brushes including a plurality of scalloped lower edges for cleaning the upper surfaces of the eggs as well as the side surfaces of the eggs.

WO95/00012 discloses a machine of a similar design, where the cylindrical brushes are adapted to move in both the longitudinal and transverse direction of the conveyor to more efficiently loosen dirt on the eggs. Liquid spray nozzles are also present in this design, and they ensure that all eggs are thoroughly wetted before being subjected to cleaning. The nozzles are cone jet nozzles, which are common in egg washing.

For further improving the cleaning of eggs, US2004/0238017A discloses an apparatus comprising multiple conveyors for transporting eggs to be cleaned through multiple sections that are vertically tiered. The multiple sections comprise liquid spray nozzles for dispensing a cleaning solution upon the eggs conveyed there through, and brushes such as cylindrical brushes, flat brushes or end brushes for specifically cleaning the end of the egg. Due to a long time of exposure to the liquid, the brushes can more efficiently clean dirt from the egg.

However, the prior art apparatuses and methods suffer from the disadvantage that eggs may be accidentally broken during washing operations, because the apparatuses are not adapted to compensate for the various sizes and quality that the eggs might have. Due to the fixed position of the brushes in relation to the conveyor a large egg might be exposed to too high force, thereby causing the egg to brake, particularly if the egg shell is of a low quality. In this context low quality eggs are eggs having dents or cracks in the shell or where the shell is thinner or otherwise more fragile than in average shell eggs. Smaller eggs on the other hand may not be sufficiently cleaned as the brushes do not get into proper contact with the shell.

Thus, it remains a problem that the natural variations in size, shape and quality of the shell eggs makes it difficult to achieve a satisfactory cleaning of the all eggs.

It is therefore an object of the present invention to provide a washing apparatus that enables shell eggs to be cleaned properly and in high volumes, and at the same time alleviates the problems associated with the natural variations in size, shape and quality of the eggs. It is a further object to provide a method that solves the problems relating to efficiently washing eggs independent of the size, shape, and the quality of the eggs.

SUMMARY OF THE INVENTION

In a first aspect of the invention, an apparatus for washing shell eggs of the kind mentioned above, includes a plurality of first liquid spray nozzles arranged above the conveyor plane, each first liquid spray nozzle being adapted to spray liquid in a first spray direction towards a first spray target axis, which is located in the conveyor plane at a first distance from the first liquid spray nozzle in the transverse direction, so that the first spray direction is inclined in relation both to vertical and to the conveyor plane. A plurality of second liquid spray nozzles may be arranged above the conveyor plane, each second liquid spray nozzle being adapted to spray liquid in a second spray direction towards a second spray target axis, which is located in the conveyor plane at a second distance from the second liquid spray nozzle in the transverse direction, so that the second spray direction is inclined in relation both to vertical and to the conveyor plane. In some embodiments, the first spray direction is opposite the second spray direction when seen in the transverse direction. Rows of first liquid spray nozzles and rows of second liquid spray nozzles may be arranged alternately in the transverse direction, and each row of liquid spray nozzles may be arranged above one egg path and sprays towards a separate spray target axis located at another egg path.

In operation, an egg travels between, and in parallel with, a row of first liquid spray nozzles and a row of second liquid spray nozzles and will thus be subjected to a liquid jet each time it passes a liquid spray nozzle. It is presently considered expedient that each egg is subjected to at least 8 liquid jets, corresponding to 4 liquid spray nozzles in each row. The number of first and second liquid spray nozzles may be equal, but does not have to be. Further, additional or fewer spray nozzles are contemplated within the scope of this disclosure.

With an egg washing apparatus of this kind, the eggs can be cleaned only by means of liquid spray nozzles, and the number of eggs that are accidentally broken are reduced because the jet impacts delivered by the nozzles are softer than the impact delivered by a brush or the like. Furthermore, the nozzles are able to compensate for the various sizes, shapes, and qualities of the eggs, since in practise approximately the same pressure is delivered to each egg independent on the distance from the nozzle to the egg. Hence, a large egg does not get exposed to considerably more force than a small egg leading to a low amount of broken and/or discarded eggs.

By arranging the nozzles so that the spray direction of each nozzle is angled in relation to vertical and to the conveyor plane, i.e. to extend in a non-perpendicular angle in relation to the conveyor plane, the spray jets hit not only the top of the eggs but also the sides and/or ends. Additionally, the angled arrangement of the nozzles allows the eggs to be exposed to jets from various positions and angles thereby facilitating a cleaning of the whole circumference of the eggs.

An additional advantage is that the apparatus provides a satisfactory cleaning of the eggs without the use of brushes or the like, which are prone to picking up dirt or egg residues from broken eggs. This means that the maintenance demands of the apparatus according to the invention will be lower than for prior art apparatuses.

Eggs conveyed through the washing unit will be subjected to a liquid jet from both first and second liquid spray nozzles, which are positioned on opposite sides of the eggs, so that the eggs are impacted by liquid from both ends during the washing.

In some embodiments, each row of liquid spray nozzles is arranged on a liquid distribution pipe located vertically above an egg guiding path. This provides for a structurally simple and reliable apparatus and that liquid distribution pipe also serves as a support for the nozzles, and the angling of the nozzles is thus optimized with regards to cleaning the ends of the eggs.

In one embodiment, both the first spray target axis and the second spray target axis are parallel with the longitudinal direction, but it will be understood that one or both of them may be angled in relation to the longitudinal direction so that the liquid spray nozzles of a row hits the eggs at different places. It is also possible to have two or more different spray target axes associated with a single row of nozzles, so that, for example, every other nozzle sprays towards one spray target axis and the rest of the nozzles spray towards another axis, or that the spray target axis may be discontinuous so that its height above the conveyor plane and/or distance from the nozzles chances at one or more points in the longitudinal direction.

In one embodiment, first and second liquid spray nozzles arranged in neighbouring rows and spraying towards each other are positioned on opposite sides of both the first and the second spray target axis associated with these rows. In such cases the first spray target axis may be located between the second spray target axis and the second liquid spray nozzles.

It is, however, also possible to provide an apparatus, where the first and second spray target axes are coinciding thereby defining a third common spray target axis.

The shape of a shell egg in two dimensions is typically described as ellipsoidal and being defined by a minor axis $d_1$ and a major axis $d_2$. The minor axis extends between the two sides of the egg and is perpendicular to the major axis. The longer major axis extends between the pointed end of the egg and the round end of the egg and constitutes the symmetry axis of the egg. In this context the minor axis will be referred to as the height of an egg, and the major axis as the length of an egg, as the egg will usually be lying on the side during cleaning, but it will be understood that the invention is not limited to such embodiments. For hens eggs the minor axis is typically from 30 to 50 mm and the major axis typically ranges from 40 to 70 mm.

Even though the invention will be described with reference to the washing of hen's eggs, it must be understood that it is not limited to this specific use. The invention may also be used for pre-washing eggs and for cleaning other types of eggs, such as for example duck eggs or quail eggs.

In one embodiment of the invention, each nozzle is positioned higher above the conveyor plane than the maximum height of the eggs, but it will be understood that all nozzles do not have to be arranged at the same height, even if located in the same row.

In one embodiment the angle between the first spray direction and vertical is 10 to 80 degrees, preferably 20 to 60 degrees, and more preferably 30 to 50 degrees. By adjusting this angle, the spray coverage of the egg may be improved or specific points on the egg may be targeted.

Similarly, the angle between the second spray direction and vertical is preferably 10 to 80 degrees, more preferably 20 to 60 degrees, and still more preferably 30 to 50 degrees.

It is noted that the angles of the first and the second spray directions do not have to be the same. If, for example, the eggs are arranged on the conveyor so that they are always oriented with the major axis perpendicularly to the longitudinal direction and with the round end in one direction and the pointed end in the opposite direction, the optimal spray directions of the first and second liquid spray nozzles may be different. Differences in the angling of the spray directions may, however, also be advantageous where the orientation of the eggs are more random, contributing for example to forcing dirt coming off the shell in a particular direction.

The cleaning of the egg may potentially be further improved by adjusting the spray direction of the first and second liquid spray nozzles so that at least one nozzle has a spray direction, which is not perpendicular to the longitudinal direction, i.e. so that the liquid will be impacting the eggs either from the front or from the back when seen in the direction of travel of the eggs.

To optimize the cleaning of the eggs it is not only the spray direction of the nozzles that may be important, but also how the first and the second nozzles are arranged in relation to each other in the washing unit. Hence, in an embodiment of the invention, the first and the second liquid spray nozzles spraying towards the same eggs are distanced in relation to each other in the longitudinal direction of the conveyor. The advantage of the first liquid spray nozzles and the second liquid spray nozzles being distanced from each other is that the two liquid jets provided from opposite sides will not collide, which may lead to a more effective use of the jet. Furthermore, the time of exposure to the liquid may be increased, when the eggs pass one nozzle after the other.

In one embodiment, the distance between first and second liquid spray nozzles in the longitudinal direction of conveyor is at least 20 mm.

The first liquid spray nozzles may be arranged in a first set of columns and the second liquid spray nozzles may be arranged in a second set of columns, where the columns of the first and second liquid spray nozzles are arranged alternating in the longitudinal direction of the conveyor. It is also possible to have two successive columns of first liquid spray nozzles or second liquid spray nozzles.

In one embodiment of the invention, at least some of the liquid spray nozzles are flat fan nozzles and/or cone nozzles adapted for spraying liquid in a fan-shaped or cone-shaped jet, the centre of said jet defining the liquid spray direction, and said jet being delimited by at least a first jet delimiting direction and a second jet delimiting direction, wherein the first jet delimiting direction intersects with the conveyor plane in a first extreme point and the second jet delimiting direction intersects with the conveyor plane in a second extreme point, and wherein the first extreme point and the second extreme point are distanced from each other. In other words, the first and second jet delimiting directions are non-parallel and the liquid jet spreads out, so that the width of the jet increases with the distance from the nozzle.

The advantage of using flat fan or cone jet nozzles is that the jet impact delivered to the eggs does not only have the ability to remove dirt from the egg, but also the possibility for increasing the exposure time during which an egg is in contact with a liquid jet. The flat fan jet further has the ability to induce a "scraping" or "peeling" effect, where dirt is forced off the shell of the egg in a well-defined direction, whereas a cone or single point jet will typically spread the dirt in many different directions. Therefore, flat fan jet nozzles are presently preferred.

It is noted that the extreme points do not have to be located on the actual conveyor, which may particularly be relevant for liquid spray nozzles located close to the edge of the conveyor. Furthermore, it is noted that the fan may be a continuous fan or composed of two or more linear or fan shaped jets arranged side by side in a fan plane.

In one embodiment, the two extreme points of a fan jet are located at different distances from the nozzle when seen in the transverse direction and distanced from each other in the longitudinal direction. In this way the fan jet is angled in relation both to the conveyor plane and to the direction of travel of the eggs. This may potentially contribute to the scraping or peeling effect described above.

The spray angle between the first jet delimiting direction and the second jet delimiting direction is preferably 10 to 120 degrees, more preferred 20 to 100 degrees, still more preferred 30 to 80 degrees.

The cleaning of an egg may be further improved by providing the liquid at elevated pressure in comparison to atmospheric pressure. Hence, in one embodiment of the invention the spray pressure of the liquid spray nozzles is from 0 to 4 bar, preferably from 0 to 2.5 bar above atmospheric pressure. It is, however, noted that all liquid spray nozzles do not need to operate at the same pressure.

The jet delivered from the liquid spray nozzles according to the invention may be provided as a continuous jet or as a discontinuous jet. However, at a pressure above 1 bar it is preferred that the jet from the liquid jet nozzle is continuous to avoid high dynamic forces affecting the shells of the eggs.

Making the spray pressure of the first and/or the second nozzles adjustable has the advantage that low quality eggs may subjected to more suitable liquid jets at lower spray pressure compared to what is used for high quality eggs or normal eggs.

The skilled person will be able to adjust the spray pressure according to the quality of the egg following a few experiments.

Suitable devices for controlling the spray pressure, such as a frequency converter and/or valves, are available to the skilled person.

When the apparatus includes a large number of liquid spray nozzles, the liquid pressure, angle spray directions, the nozzles types, the mutual distance between nozzles, the number of spray target axes for each row of eggs, etc. may vary along the length of the apparatus in order to achieve optimal cleaning. This may for example allow a first section of the washing unit to be adapted for loosening dirt from the shells of the eggs, while a second section is adapted for rinsing dirt off the shells.

The egg conveyor preferably provides a predefined path for guiding the eggs in the longitudinal direction of the apparatus, also referred to as egg paths, without breaking the eggs during the transport. Suitable egg conveyors according to the invention may further have means for controlling the mutual distance between eggs in the longitudinal and transverse direction of the conveyor.

In one embodiment, the conveyor is a roller conveyor, where eggs are conveyed by rotational movement of rollers mounted on shafts that extend in the transverse direction of the conveyor. The shafts are distanced in the longitudinal direction of the conveyor by a length that ensures that eggs cannot fall between two successive rollers. Typically, the eggs to be washed are positioned on the conveyor so that the major axis of the egg is parallel with the transverse direction of the conveyor, i.e. in parallel with the shafts and rollers.

The advantage of using a rotational movement to convey the eggs is that the rotational movement not only drives the eggs in the longitudinal direction of the conveyer, but also makes the eggs rotate, typically about their major axis, while conveyed. This rotation during the transport makes the whole circumference of the eggs more accessible to the liquid jets. Thus the degree of cleaning may be further improved without adding additional cleaning means such as brushes.

When the egg conveyor is a roller conveyer, the space between two successive shafts in the longitudinal direction of the roller conveyor will act as an egg holder preventing accidental collisions with other eggs and keeping a well-defined distance between individual eggs in the longitudinal direction of the conveyor. When using other types of conveyors, pins, flanges or brushes projecting from the supporting surface of the conveyor may be used as egg holders. Successive egg holders in the longitudinal direction together form an egg path.

In a further embodiment, the rollers mounted on the shafts are provided with holding sections and supporting sections, wherein the diameter of the holding sections are larger than the diameter of the supporting sections. When transferred to the conveyor, the eggs become positioned on the supporting section of the rollers under the influence of gravity, and the holding sections prevents the egg from moving in the transverse direction of the conveyor. In this way a plurality of eggs may be positioned in the transverse direction of the conveyor with a pre-determined distance between them, and such that each egg travels on a predefined path in the longitudinal direction of the conveyor. Hence, in this particular embodiment, egg holders are defined by the distance between two successive shafts in the longitudinal direction of the conveyor and by the holding sections in the transverse direction of the conveyor.

The number of egg holders in the transverse direction should preferably correspond to the number of first and second liquid spray nozzles in each column of nozzles, but different arrangements are possible.

The liquid used is selected for its ability to clean eggs, but should also be safe to handle and economically viable. In one embodiment the liquid is water. In a particular embodiment the liquid is a washing solution comprising water and a cleaning agent. The cleaning agent should have the ability to improve the cleaning of eggs, but may also be used for adjusting the properties of the solution, such as the pH and viscosity, in order, for example, to facilitate recirculation of the washing solution. In one embodiment the liquid may be a strong alkaline solution, i.e. pH around 10 to 12, for providing antimicrobial properties to the liquid.

Suitable cleaning agents are cleaning agents that are approved in food industry for use in egg washing, such as for example chlorine (sodium hypochlorate), sodium carbonate or hydrogen peroxide.

Often foam formation is associated with the use of cleaning agents. Hence, in one embodiment an anti-foaming agent may be present in the washing liquid. A suitable anti-foaming agent may be a silicone based anti-foam agent.

It is noted that the liquid distribution system may be adapted for supplying different liquids to different nozzles. As an example, nozzles close to the egg in-feed may be supplied with a liquid containing a relatively high concentration of a cleaning agent, while nozzles close to the egg outlet are supplied with clean water.

In one embodiment, the apparatus may comprise a recirculation system for keeping the spray liquid usage at a minimum. Suitable recirculation systems are available to the skilled person, and often comprise more than one filter for removing dirt, shell fragments and egg residues in order to obtain liquid with a sufficiently high purity. A suitable filter may be chosen from but not limited to a rotational filter or an in-line filter. It is also possible to add an anti-foam agent to the liquid in the recirculation system in order to reduce foam formation associated with the presence of egg residue in the liquid.

In a further aspect of the invention, a method is provided for washing shell eggs, where step ii) described above includes the following steps:

a) subjecting the eggs in the washing unit to a liquid jet from at least one first liquid spray nozzle spraying in a first spray direction, which extends in a non-perpendicular angle in relation to the conveyor plane, b) subjecting the eggs in the washing unit to a liquid jet from at least one second liquid spray nozzle spraying in a second spray direction, which extends in a non-perpendicular angle in relation to the conveyor plane, wherein the first spray nozzle and second spray nozzle are arranged on opposite sides of the egg when seen in the transverse direction and at a distance above the conveyor plane so that the liquid sprayed in the first spray direction and the liquid sprayed in the second spray direction hits the egg from opposite sides in a downwards angle, and where steps a) and b) are repeated.

As will be understood from the description of the apparatus above, the repetition of steps a) and b) normally involves passing the egg past several different first liquid spray nozzles and several different second liquid spray nozzles, which are arranged in respective rows extending in the longitudinal direction, but it is not excluded to pass an egg past the same liquid spray nozzle two or more times.

Preferably, at least one of the first and/or second liquid spray nozzle is arranged at a distance from the egg in the transverse direction as this will allow the liquid to be sprayed directly onto the end or ends of the egg.

By providing a method of this kind shell eggs will be subjected to a series of liquid jets during the transport through the washing station along a predefined path. The result of the method is that the eggs will be effectively cleaned, and especially the ends of the egg are easily cleaned when compared to prior art methods.

In one embodiment the egg is subjected to a liquid jet from a first and a second liquid spray nozzle at least 8 times, corresponding to 16 exposures in total. The number of times eggs are subjected to step a) and step b) does not have to be equal and an increased number of times the eggs are subjected to step a) or step b) is advantageous for obtaining clean eggs.

To increase the economic viability of the method, each liquid spray nozzle should be arranged to deliver the liquid jet in the most effective way possible. Also, it is desirable that the length of the apparatus is as short as possible in order to save space. One solution to solve this problem is to arrange the eggs on the conveyor in a controlled manner, so that the distance between each egg in the longitudinal and transverse direction of the conveyor is optimized. This may be achieved by arranging the eggs in a plurality of egg holders, so that the distance between eggs becomes well-defined, for example as describe with reference to the apparatus above.

Preferably, the distance between two successive eggs in the longitudinal direction of the conveyor is at least 1 cm, corresponding to a centre distance between eggs of at least 5 cm, and the distance between two neighbouring eggs in the transverse direction of conveyor is preferably at least 0.5 cm.

To further improve the viability of the present invention, it is an advantage that the downward angle of the first and/or second spray direction in relation to a vertical plane is 10 to 80 degrees, preferably 20 to 60 degrees, and more preferably 30 to 50 degrees.

The shape of the liquid jet may have an influence of the washing performance. Hence, in a preferred embodiment the liquid spray nozzle is a flat fan jet nozzle.

By using a flat fan jet nozzle it is possible to provide a liquid jet to the eggs, which has been shown to be very effective for removing dirt, and it is possible to adjust the spray angle of the liquid jet. In a particular embodiment the spray angle of the flat fan jet nozzle is 10 to 120 degrees, preferably 20 to 100 degrees, more preferably 30 to 80 degrees. The advantage of a spray angle in this range is that the impact time, during which each jet is impacting the egg, may be increased, compared to if using a linear jet. By increasing the impact time, the washing performance of each liquid spray nozzle is improved. Moreover, the fan shape of the jet reduces the risk of the jet being disturbed by drops ricocheting off the egg shell.

In some embodiments the distance between two successive eggs in the longitudinal direction and the spray angle of the flat fan jet nozzle may be adjusted in relation to each other in a way, which allows the liquid jet of the first and the second spray nozzle to impact at least two successive eggs. Thus, it may be possible to further increase the effectiveness of each liquid spray nozzle.

The skilled person will be able to determine the optimal spray angles following a few experiments.

It is noted that the term liquid spray nozzle should be understood as any nozzle suitable for spraying liquids. Any reference to a spray nozzle or merely a nozzle in this text is to be understood as a reference to a liquid spray nozzle unless otherwise stated.

Likewise, the term liquid should be understood in its broadest sense to comprise all liquids such as water, water based solution or dispersions with suitable cleaning agents as elaborated above.

Each specific embodiment and variation of features applies equally to each aspect of the invention unless specifically stated otherwise. This for example means that the specific orientation of liquid spray nozzles and the types of conveyor described with reference to the apparatus also applies to the method.

BRIEF DESCRIPTION OF THE DRAWINGS

In the following the invention will be described in more specific detail with reference to the drawings, where.

DETAILED DESCRIPTION OF THE INVENTION

Figure 1:
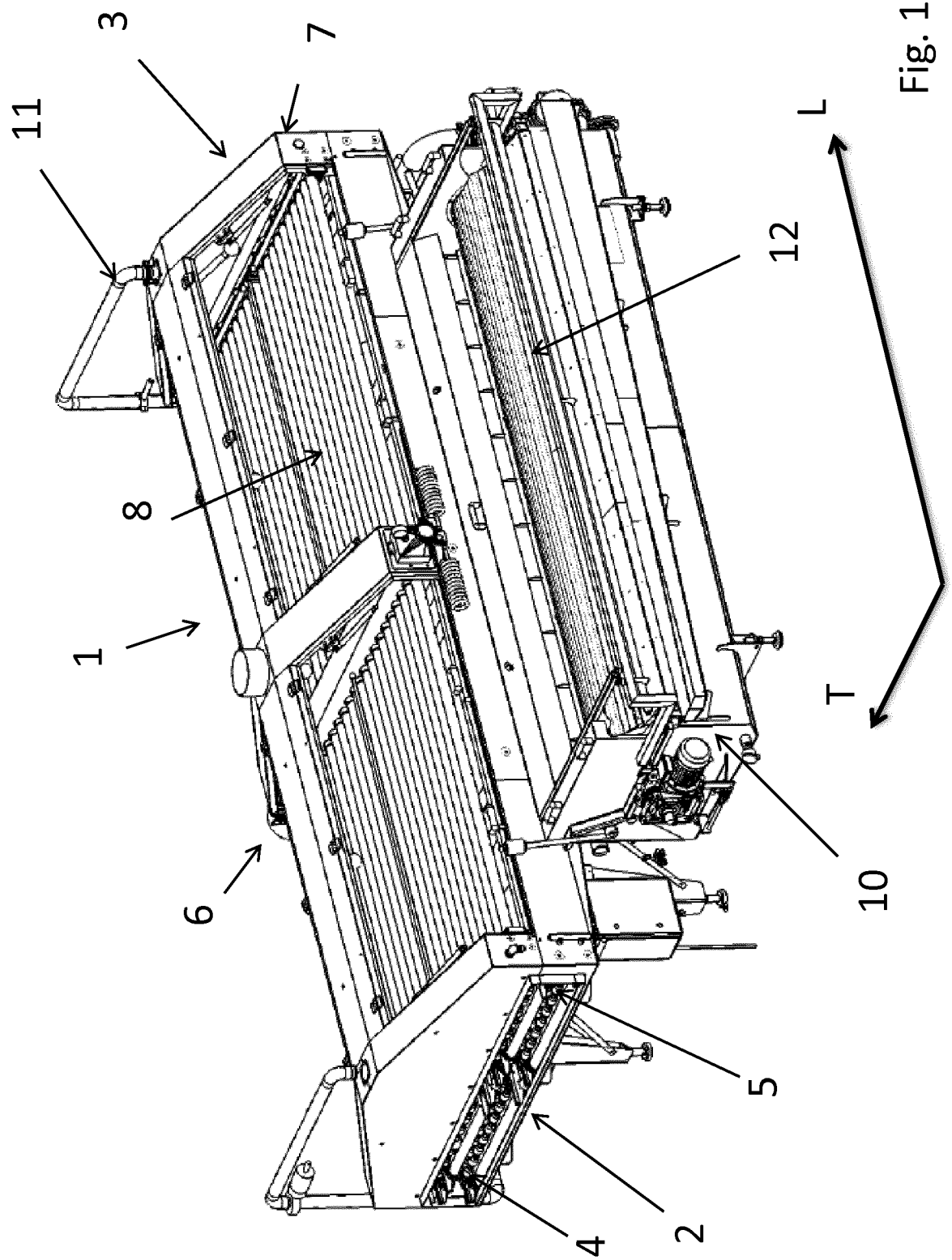
FIG. 1 shows an apparatus according to the invention in a perspective view.

Referring initially to FIG. 1, an apparatus 1 according to the invention comprises egg infeed 2, an egg outlet 3, an egg conveyor 4, and a washing zone including a washing unit 6. The egg conveyor 4 extends in a longitudinal direction L from the egg in-feed 2 to the egg outlet 3 and has a transverse direction T perpendicular to the longitudinal direction. Said longitudinal direction and said transverse direction defines a conveyor plane and the transverse direction is substantially horizontal.

The washing unit 6 comprises a housing 7 in which a liquid distribution system including liquid distribution pipes 8 extending in the longitudinal direction is mounted. In the embodiment shown in FIG. 1, eighteen liquid distribution pipes 8 are arranged to extend above pre-defined paths for eggs as will be described in detail later. In operation, covers (not shown) may be provided over the liquid distribution pipes in order to provide a closed housing.

A number of first and second liquid spray nozzles are arranged on each of the liquid distribution pipes as will be described in detail later. The number of nozzles on each pipe may vary. The apparatus in this particular embodiment has a length of 4.5 m and comprises 756 liquid spray nozzles in total, although the apparatus may be shorter, or longer, and comprise fewer, or more, liquid spray nozzles.

The liquid distribution system may have any shape and size suitable for providing sufficient amounts of liquid to the nozzles. All of the liquid spray nozzles may be provided with liquid via one liquid distribution system that extends over the total width and length of the washing unit, but it is also possible to use two or more separate systems, for example in order to facilitate cleaning and prevent the growth of bacteria in the liquid distribution system.

The conveyor 4 in FIG. 1 is a roller conveyor comprising a plurality of shafts (not visible) each extending in the transverse direction. Rollers 5 with varying diameter along their length axis are rotatably mounted on the shafts to provide egg holders and drive the eggs in the longitudinal direction in a manner well known to the skilled person. In this embodiment, the conveyor 4 is adapted to transport eggs in columns of eighteen eggs in the transverse direction of the conveyor 4, however, the number of eggs that the conveyor 4 may hold in the transverse direction of the conveyor may be higher or lower.

A recycling system 10 is connected to the washing unit 6 and intended to recycle the liquid used to clean the eggs in the washing unit. A liquid communication (not visible in FIG. 1) between the recycling system and the washing unit allows the used liquid to be transferred to the recycling system. The recycling system comprises a roller filter 12 that is adapted to purify used cleaning liquid from the washing unit. The recycling system 10 may further comprise an in-line filter adapted to further purify the liquid, i.e. remove contaminants, dirt and residues. The purified liquid is transferred back to the liquid distribution pipes 8 via a connection pipe 11. Furthermore, the liquid distribution system may be in liquid communication (not shown) with a liquid source that provides a fresh liquid, which has not been recycled, to the apparatus.

Figure 2:
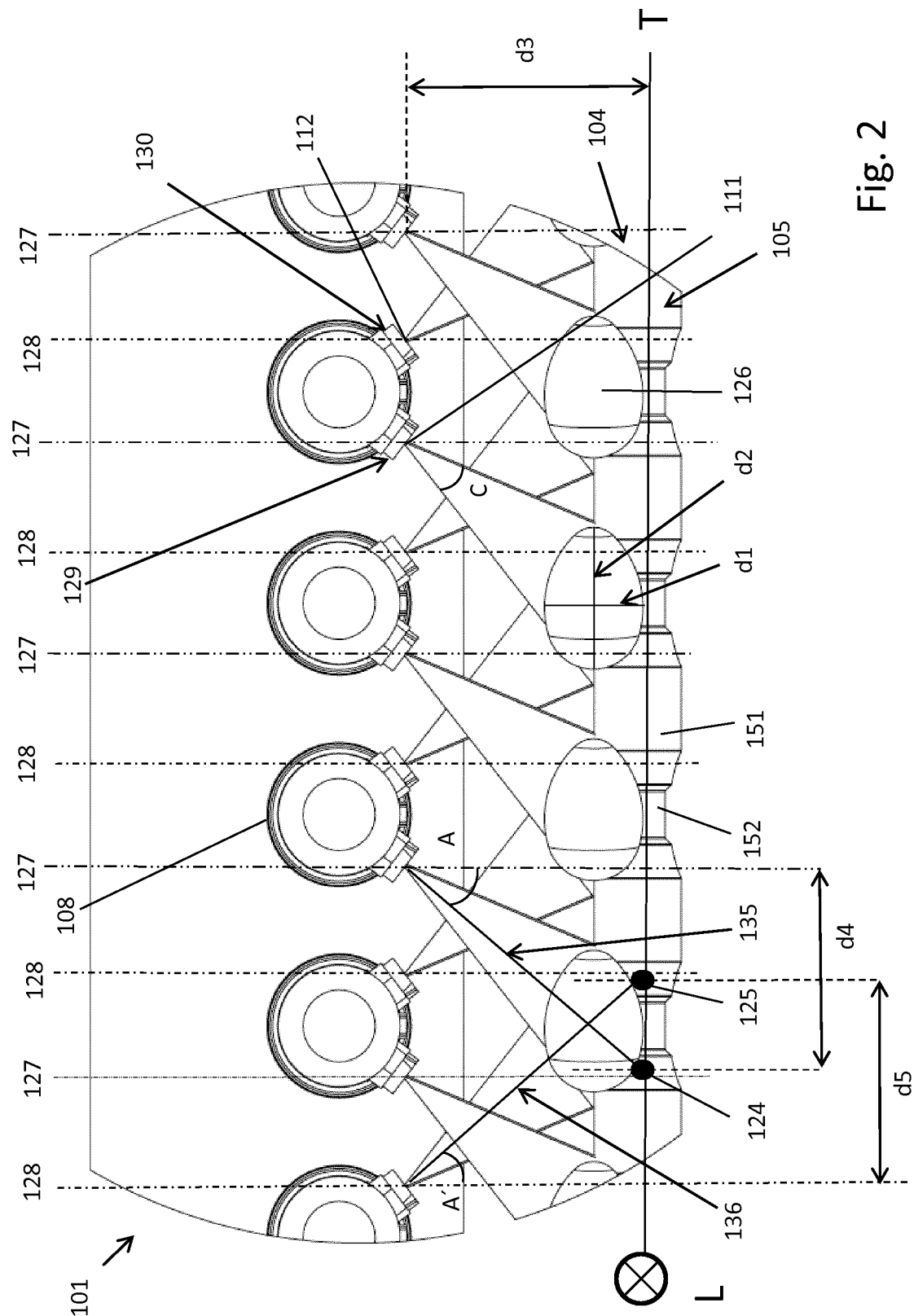
FIG. 2 shows a section of an embodiment of a washing unit of an apparatus according to the invention seen in a front view during operation.
Figure 3:
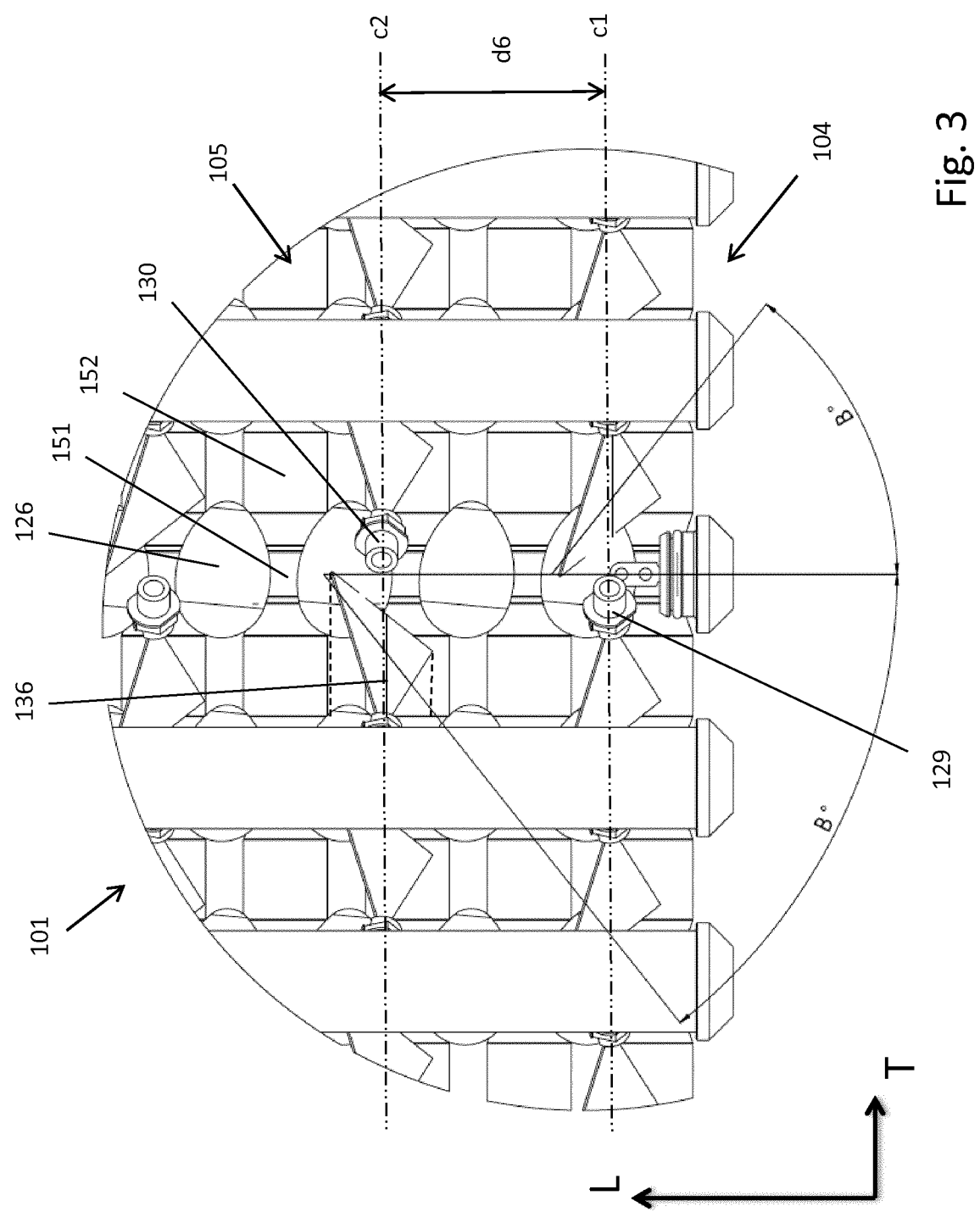
FIG. 3 shows a section of the apparatus in FIG. 2 seen in a top view and with one liquid distribution pipe removed, FIG. 4 corresponds to FIG. 3 but showing a larger section of the apparatus and with some of the liquid distribution pipes made transparent.
Figure 4:
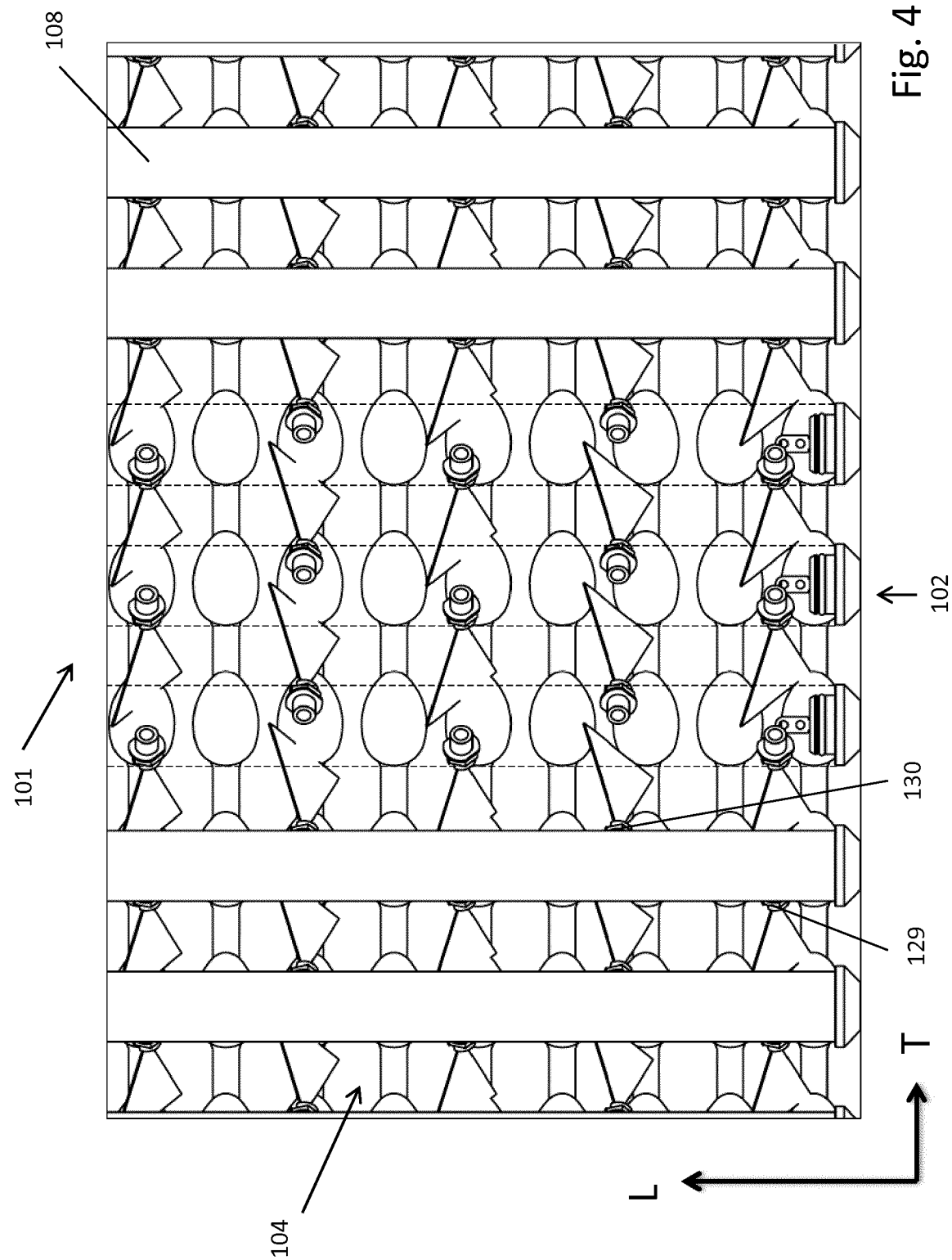

Turning now to FIGS. 2-4, sections of an embodiment of an apparatus 101 for washing shell eggs is shown. Features having the same function as described with reference to FIG. 1 have been given the same reference numbers, but with 100 added.

In FIG. 2 the apparatus 1 is seen in a front view, where the viewer is looking in the longitudinal direction L of the conveyor 104, which is also the transport direction of the eggs 126. Several eggs 126 are positioned side by side with their major axis $d_2$ extending in the transverse direction T of the conveyor 104 and each egg shown is representing a row of eggs extending into the washing unit in the longitudinal direction.

The conveyor comprises a series of rollers 105, only one of which is visible in FIG. 2, each roller comprising supporting sections 152 and holding sections 151. The eggs 126 are placed on the supporting sections 152 and are restricted from moving in the transverse direction of the conveyor 104 by the holding sections 151. Due to a distance between the rollers 105, which can be seen in FIG. 3, the side of each egg facing downwards is located somewhat below the upper side of the supporting section 152, and the egg is supported by two supporting sections of two neighbouring rollers 105 in a manner well known to the skilled person. Supporting sections 152 of neighbouring rollers are arranged in continuation of each other in the longitudinal direction L so that together they form an egg path allowing eggs to move forward in the longitudinal direction when the rollers turn.

Above each row of eggs 126 is a liquid distribution pipe 108 that ex-tends in the longitudinal direction of the conveyor 104. Each liquid distribution pipe 108 is illustrated with a first and a second liquid spray nozzle 129, 130, each representing a row of first and second liquid spray nozzles arranged along the length of the liquid distribution pipe. That is, each row of liquid spray nozzles is arranged above one egg path and sprays towards a separate spray target axis located at another egg path as will be described with reference to FIGS. 3 and 4 below.

The liquid spray nozzles are distanced from the conveyor plane by a distance $d_3$ so that the liquid impacts in a downward angle on the egg 126 to be washed. In this embodiment each nozzle is positioned higher above the conveyor plane than the maximum height of the egg, i.e. the minor axis $d_1$, which allows the liquid jets provided by the nozzles to impact both the ends and the side surfaces of the egg 126 as will be elaborated below.

The liquid spray nozzles 129, 130 are in this embodiment flat fan jet nozzles. The flat fan jet nozzles 129, 130 each have a spray direction 135, 136 extending from a respective nozzle opening 111, 112 located in respective nozzles planes 127, 128 towards a respective first and second spray target axis 124, 125 and against an egg 126 that is positioned below a neighbouring liquid distribution pipe 108.

In this embodiment, the first nozzle plane 127 is distanced from the first spray target axis 124 by a distance $d_4$ in the transverse direction, and the second nozzle plane 128 is distanced from the first spray target axis 125 by a distance $d_5$ in the transverse direction. As will be seen the first target axis 124 is located between the second target axis 125 and the second nozzle plane 128. This allows the jets provided by the two liquid spray nozzles to both cover substantially the entire side surface of the egg 126 facing upwards, and thanks to the distance between the nozzles in the longitudinal direction, which may be seen in FIGS. 3 and 4 the jets do not collide.

It will be understood that even though only one first target axis 124 and one second target axis 125 is shown, there will be a target axis for each row of nozzles, and that the target axes 124, 125 may be coinciding or that there may different target axes at other sections of the apparatus.

FIG. 2 further shows how the liquid jet provided from the first and second opening 111, 112 spreads out to form a fan. The flat fan jet thus provided by the nozzles 129, 130 have a spray angle C of approximately 30 degrees in this embodiment, but the angle may be from 10 to 120 degrees. Furthermore, as will be seen from FIG. 3, the nozzles are arranged so that each flat fan jet is oriented in a plane, which is angled in relation to the transverse direction in order to increase the time that the egg is exposed to the liquid, thereby increasing the efficiency of each nozzle. It is contemplated that the spray angle and the orientation of the liquid jet may be independently chosen for each flat fan jet nozzle.

The angles between the spray directions 135, 136 and vertical is denoted A. The angle A is in the present embodiment about 45 degrees, but may be any angle from 10 to 80 degrees, i.e. the nozzles should be arranged so that the spray direction of each nozzle is angled both in relation to vertical and to the conveyor plane, or, in other words, the spray direction is to extend in a non-perpendicular angle in relation to the conveyor plane.

It is contemplated that the angle A can be different for the first and second nozzles, particularly if the eggs are arranged so that the pointed end is always facing the same way. First or second liquid spray nozzles in the same row may also have different angles A, so that for example the angle increases or decreases each time an egg is subjected to a liquid jet from a new liquid spray nozzle. This could for example be achieved by making every other first liquid spray nozzle 129 in FIG. 2 spray towards an axis coinciding with the second spray target axis 125 instead of the first spray target axis 124.

FIG. 3 further shows how the first liquid spray nozzles 129 and second liquid spray nozzles 130 in this embodiment are aligned in the transverse direction of the conveyor 104 to form respective columns $c_1$, $c_2$, which are distanced from each other in the longitudinal direction L by a distance $d_6$. The first nozzles 129 are all adapted to have a spray direction to the same side i.e. in this embodiment to the left side and the second nozzles 130 are adapted to spray towards right side. This arrangement of the first liquid spray nozzles 129 is advantageous since it prevents a collision of the liquid jets, and eggs 126 moving in the longitudinal direction of the conveyor 104 will be impacted first by a liquid jet coming from right side of the egg, then by a liquid jet coming from left side of the egg, then from the right side again, etc. This may contribute to a "rubbing" effect, loosening dirt from the shells of the eggs.

The conveyor 104 may comprise more egg holders than shown in FIG. 2, and the number of first and second liquid spray nozzles 129, 130 provided at each liquid distribution pipe 108 may be higher than shown in FIGS. 3 and 4. Furthermore, the number of liquid distribution pipes 108 may be independently chosen from the number of egg holders on the conveyor 104 and the arrangement of the nozzles 129, 130 with respect to the liquid distribution pipe 108 may be embodied differently from what is shown in the drawing. As an example, a single liquid distribution pipe 108 may be provided with three or more rows of liquid spray nozzles 129, 130 spraying against different spray target axes.

As will be seen in FIG. 3 the angle projection B of the flat fan jet on-to the horizontal plane is approximately 50 degrees.

In FIG. 4 three of seven liquid distribution pipes 108 shown are illustrated as transparent, so as to better show how the liquid spray nozzles 129, 130 are arranged in the washing unit 101.

The liquid distribution pipes 108 arranged above the conveyor 104 are each provided with a plurality of first and second liquid spray nozzles 129, 130. Even though only three first liquid spray nozzles 129 and two second liquid spray nozzles 130 are shown on each liquid distribution pipe 108 in FIG. 4 it will be understood that the number of spray nozzles 129, 130 will usually be higher. Furthermore, it must be understood that the first and second nozzles do not have to alternate as shown, but that each egg may pass several nozzles having the same overall spray direction directly after each other.

In operation, eggs to be cleaned are transported on the roller conveyor 104 extending from the egg in-feed 102 to the egg output (not shown). The transport direction is in the longitudinal direction L of the conveyor. The egg will during the transport from the egg in-feed to the egg output be transported into a washing unit along a predefined path on the conveyor. In the washing unit each egg is subjected to at least one first liquid jet from at least one first liquid spray nozzle 129 arranged above the conveyor having a spray direction, which is angled downwards (e.g. angle A) towards the eggs at 10-80 degrees, preferably 20-60 degrees, more preferably 30 to 50 degrees. As the eggs are transported further through the washing unit, each egg is subjected to at least one second liquid jet from at least one second liquid spray nozzle 130 arranged above the conveyor having a spray direction in downwards angle (e.g. angle A) towards the eggs 10 to 80 degrees, preferably 20 to 60 degrees, more preferably 30 to 50 degrees. The liquid spray nozzles are arranged so that the first liquid spray nozzles 129 are directed substantially against one end of the eggs while the second liquid spray nozzles 130 are directed substantially against the opposite end of the eggs to clean the eggs. In other words, the first and the second nozzle plane are positioned on opposite sides of the predefined path that transports each row of eggs through the washing unit.

If the eggs are high quality eggs it may be advantageous to adjust the liquid spray pressure to around 2.5 bar above atmospheric pressure. However, if the eggs have fragile shells or small bumps, which is typical for low quality egg, then it might be preferred to adjust the liquid spray pressure of the jet to 0.5 above atmospheric pressure.

Figure 5:
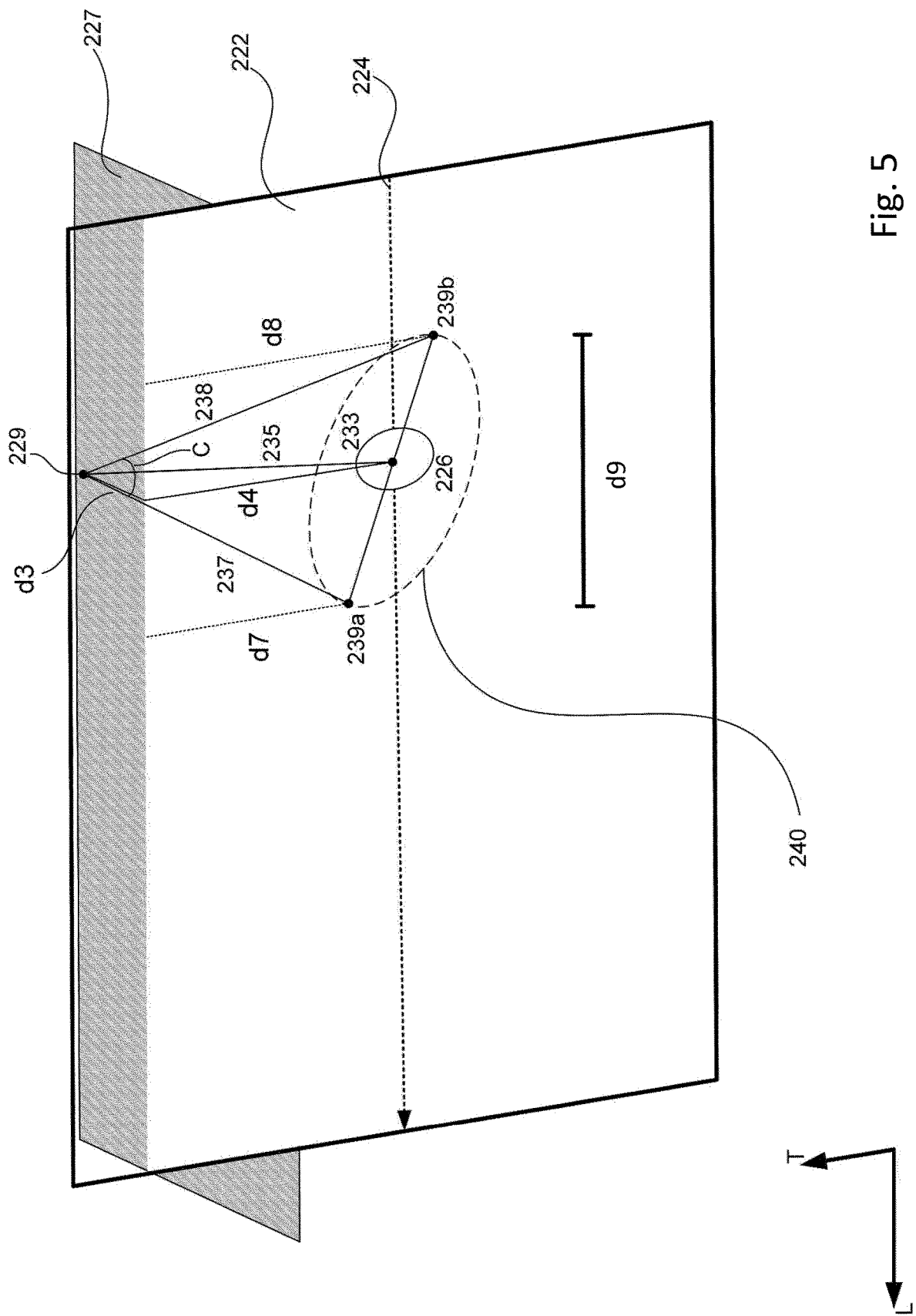
FIG. 5 is a sketch illustrating the position of a flat fan spray nozzle in an apparatus according to the invention with imaginary planes, spray target axis, spray direction and jet delimiting directions.

A further illustration of the geometry of a flat fan liquid jet is given in FIG. 5, where the liquid is sprayed from a first liquid spray nozzle 229. Features having the same function as described with reference to FIGS. 2-4 have been given the same reference numbers, but with 100 added.

As in the previously described embodiments, the flat fan jet nozzle 229 is arranged on a nozzle plane 227 that is parallel to the longitudinal direction L and perpendicular to the conveyor plane 222. The opening of the flat fan jet nozzle 229 is distanced from the conveyor plane 222 by a distance $d_3$, and the distance $d_3$ is larger than the minor axis of the egg so that the opening of the nozzle 229 is placed above the top the egg 226.

The nozzle 229 has a spray direction 235 towards a point 233 on a spray target axis 224. Said spray target axis 224 and nozzle plane 227 is distanced by a distance $d_4$ in the transverse direction T, so that the egg 226 travelling along the spray target axis 224 will be subjected to a jet having a downwards angle towards the egg in the same way as described with reference to FIGS. 2-4 above.

The flat fan jet nozzle 229 is providing a flat fan jet which is delimited by a first and a second jet delimiting direction 237, 238 defining a spray angle C, which is here of approximately 40 degrees. In this way, a flat fan jet sprayed against an egg 226 travelling on the conveyor intersects the conveyor plane 222 at a first extreme point 239a and a second extreme point 239b i.e. the two intersecting points between the jet delimiting directions 237, 238 and the conveyor plane 222.

The shortest distances to the nozzle plane 227 from the first and second extreme point 239a, 239b are denoted as $d_7$ and $d_8$, respectively. In FIG. 5, just as in the embodiment in FIGS. 2-4, $d_7$ and $d_8$ are not equal and the first extreme point is distanced from the second extreme point in the longitudinal direction by a distance $d_9$, so as the flat fan jet is oblique both in relation to the longitudinal direction L and to the transverse direction T.

The overall direction of a liquid jet, which is dispensed from the first opening 229, i.e. the centre axis of the fan, is denoted as the spray direction of the nozzle. If the first liquid spray nozzle were instead adapted for providing a cone-shaped jet, the first spray direction 235 would thus be the symmetry axis of the cone, and two extreme points would be defined as the points where the cone intersects with the conveyor plane having the longest mutual distance in the longitudinal direction as illustrated by the oval 240 drawn in broken line in FIG. 5.

In addition to the embodiment described above, it is contemplated that the conveyor may comprise a plurality of sections, wherein the sections of the conveyor may be vertically tiered. It is further contemplated that one or more third liquid spray nozzle(s) may be present in the washing unit. Such third liquid spray nozzles could be arranged directly above a row of eggs and could be different nozzle type than the first and second liquid spray nozzles, for example cone spray nozzles when the first and second liquid spray nozzles are flat fan nozzles.

It is contemplated that if the invention is used as a pre-washer then it may be combined with a more traditional washing unit comprising brushes, which is arranged downstream from the pre-washer.

It is contemplated that prior to the eggs being fed to the egg in-feed of the washing unit they have undergone a pre-wash performed in a suitable station such as a pre-washing station.

It is contemplated that the liquid jet provided to the egg may have various shapes depending on the shape of the nozzle openings, which may be selected independently for each nozzle.

It is contemplated that the eggs may be positioned on the conveyor by means of an accumulator for the purpose of dividing the eggs into columns and organizing them in an individual position on the conveyor.

The present invention includes preferred and particular embodiments, which have been disclosed in the drawings and the previous description. It is clear that the present invention comprises several of arrangement and positions for various elements. However, this is not intended to limit the scope of the invention.

The invention claimed is:

1. An apparatus for washing shell eggs comprising:
an egg in-feed;
an egg outlet;
an egg conveyor extending in a longitudinal direction from the egg in-feed to the egg outlet and having a transverse direction that is perpendicular to the longitudinal direction and substantially horizontal, wherein the longitudinal and transverse direction defines a conveyor plane; and
a washing zone including a washing unit, the washing unit comprising a plurality of liquid spray nozzles and a liquid distribution system for supplying a liquid to the liquid spray nozzles;
wherein:
a plurality of egg paths for guiding rows of eggs are defined in the longitudinal direction of the apparatus;
the liquid spray nozzles are arranged in a plurality of rows extending in the longitudinal direction of the conveyor, and each row is arranged at a distance from the other rows in the transverse direction;
the plurality of liquid spray nozzles comprises:
a plurality of first liquid spray nozzles arranged above the conveyor plane, each first liquid spray nozzle being adapted to spray liquid in a first spray direction towards a first spray target axis, which is located in the conveyor plane at a first distance from the first liquid spray nozzle in the transverse direction, so that the first spray direction is inclined in relation both to vertical and to the conveyor plane; and
a plurality of second liquid spray nozzles arranged above the conveyor plane, each second liquid spray nozzle being adapted to spray liquid in a second spray direction towards a second spray target axis, which is located in the conveyor plane at a second distance from the second liquid spray nozzle in the transverse direction, so that the second spray direction is inclined in relation both to vertical and to the conveyor plane;
the plurality of first liquid spray nozzles and the plurality of second liquid spray nozzles are positioned along a same axis in the longitudinal direction;
the first spray direction is opposite the second spray direction when seen in the transverse direction;
columns of first liquid spray nozzles and columns of second liquid spray nozzles are arranged alternately in the longitudinal direction along the same axis; and
each row of liquid spray nozzles is arranged above one egg path and sprays towards a separate spray target axis located at another egg path.

2. The apparatus according to claim 1, wherein each row of liquid spray nozzles is arranged on a liquid distribution pipe located vertically above one respective egg path.

3. The apparatus according to claim 2, wherein at least one of the plurality of liquid spray nozzles is a flat fan nozzle or a cone nozzle adapted for spraying liquid in a respective fan-shaped or cone-shaped jet, the centre of the jet defining the respective liquid spray direction, and the jet being delimited by at least a first jet delimiting direction and a second jet delimiting direction, wherein the first jet delimiting direction intersects with the conveyor plane in a first extreme point and the second jet delimiting direction intersects with the conveyor plane in a second extreme point, and wherein the first extreme point and the second extreme point are distanced from each other.

4. The apparatus according to claim 3 wherein:
the first spray direction is inclined in relation to vertical with an angle of 10 to 80 degrees; or
the second spray direction is inclined in relation to vertical with an angle of 10 to 80 degrees.

5. The apparatus according claim 3, wherein a spray angle of the flat fan nozzle or cone nozzle between the first jet delimiting direction and the second jet delimiting direction is 10 to 120 degrees.

6. The apparatus according to claim 3, wherein the at least one of the plurality of nozzles is a flat fan nozzle, and wherein the first and second extreme points are located at different distances from the respective nozzle when seen in the transverse direction and distanced from each other in the longitudinal direction.

7. The apparatus of claim 3, wherein at least one of the plurality of liquid spray nozzles is a flat fan nozzle and at least one of the plurality of liquid spray nozzles is a cone nozzle.

8. The apparatus of claim 7, wherein a spray angle of each of the at least flat fan nozzle and the at least one cone nozzle between the first jet delimiting direction and the second jet delimiting direction is 20 to 100 degrees.

9. The apparatus according to claim 1, wherein, when seen in the transverse direction, a row of first liquid spray nozzles and a neighbouring row of second liquid spray nozzles are positioned on opposite sides of both the first and the second spray target axis associated with each respective row of liquid spray nozzles.

10. The apparatus according to claim 1, wherein the first liquid spray nozzles and the second liquid spray nozzles are arranged in respective columns extending in the transverse direction; and wherein each of the respective columns is separated by a distance in the longitudinal direction.

11. The apparatus according to claim 1, wherein the spray pressure of at least one of each of the plurality of first spray nozzles and if the plurality of second spray nozzles is adjustable.

12. An apparatus for washing shell eggs comprising:
an egg in-feed;
an egg outlet;
an egg conveyor extending in a longitudinal direction from the egg in-feed to the egg outlet and having a transverse direction that is perpendicular to the longitudinal direction and substantially horizontal, wherein the longitudinal and transverse direction defines a conveyor plane; and
a washing zone including a washing unit, the washing unit comprising a plurality of liquid spray nozzles and a liquid distribution system for supplying a liquid to the liquid spray nozzles;
wherein:
a plurality of egg paths for guiding rows of eggs are defined in the longitudinal direction of the apparatus;
the liquid spray nozzles are arranged in a plurality of rows extending in the longitudinal direction of the conveyor, and each row is arranged at a distance from the other rows in the transverse direction;
the plurality of liquid spray nozzles comprises:
a plurality of first liquid spray nozzles arranged above the conveyor plane, each first liquid spray nozzle being adapted to spray liquid in a first spray direction towards a first spray target axis, which is located in the conveyor plane at a first distance from the first liquid spray nozzle in the transverse direction, so that the first spray direction is inclined in relation both to vertical and to the conveyor plane; and
a plurality of second liquid spray nozzles arranged above the conveyor plane, each second liquid spray nozzle being adapted to spray liquid in a second spray direction towards a second spray target axis, which is located in the conveyor plane at a second distance from the second liquid spray nozzle in the transverse direction, so that the second spray direction is inclined in relation both to vertical and to the conveyor plane;
the first spray direction is opposite the second spray direction when seen in the transverse direction;
the plurality of first liquid spray nozzles is assembled in two or more rows and the plurality of second liquid spray nozzles is assembled in two or more rows, wherein the two or more rows of first liquid spray nozzles are arranged alternately with the two or more rows of second liquid spray nozzles in the transverse direction; and
each row of liquid spray nozzles is arranged vertically above one egg path and sprays towards a separate spray target axis located at another egg path.

13. The apparatus according to claim 12, wherein each row of liquid spray nozzles is arranged on a liquid distribution pipe located vertically above one respective egg path.

14. The apparatus according to claim 13, wherein at least one of the plurality of liquid spray nozzles is a flat fan nozzle or a cone nozzle adapted for spraying liquid in a respective fan-shaped or cone-shaped jet, the centre of the jet defining the respective liquid spray direction, and the jet being delimited by at least a first jet delimiting direction and a second jet delimiting direction, wherein the first jet delimiting direction intersects with the conveyor plane in a first extreme point and the second jet delimiting direction intersects with the conveyor plane in a second extreme point, and wherein the first extreme point and the second extreme point are distanced from each other.

15. The apparatus according to claim 14 wherein:
the first spray direction is inclined in relation to vertical with an angle of 10 to 80 degrees; or the second spray direction is inclined in relation to vertical with an angle of 10 to 80 degrees.

16. The apparatus according claim 14, wherein a spray angle of the flat fan nozzle or cone nozzle between the first jet delimiting direction and the second jet delimiting direction is 10 to 120 degrees.

17. The apparatus according to claim 14, wherein the at least one of the plurality of nozzles is a flat fan nozzle, and wherein the first and second extreme points are located at different distances from the respective nozzle when seen in the transverse direction and distanced from each other in the longitudinal direction.

18. The apparatus according to claim 12, wherein, when seen in the transverse direction, a row of first liquid spray nozzles and a neighbouring row of second liquid spray nozzles are positioned on opposite sides of both the first and the second spray target axis associated with each respective row of liquid spray nozzles.

19. The apparatus according to claim 12, wherein the first liquid spray nozzles and the second liquid spray nozzles are arranged in respective columns extending in the transverse direction; and wherein each of the respective columns is separated by a distance in the longitudinal direction.

20. The apparatus according to claim 12, wherein the spray pressure of at least one of each of the plurality of first spray nozzles and if the plurality of second spray nozzles is adjustable.

* * * * *